Feb. 26, 1929.
T. T. SCOTT
1,703,460
FURNACE
Filed Aug. 21, 1926
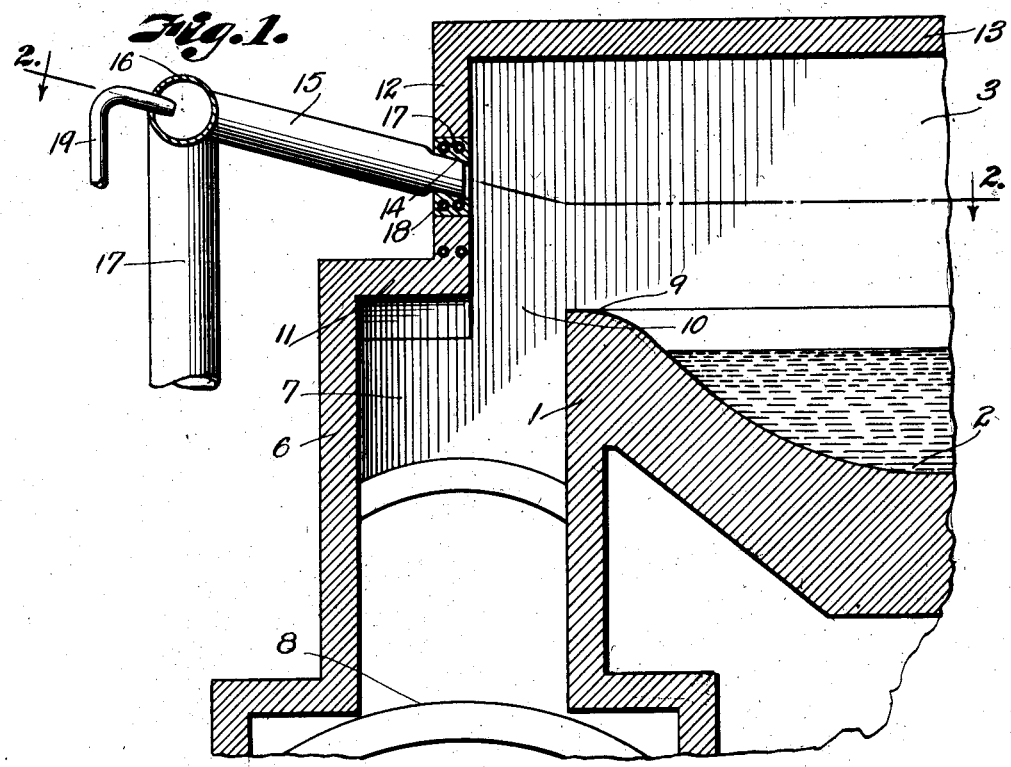
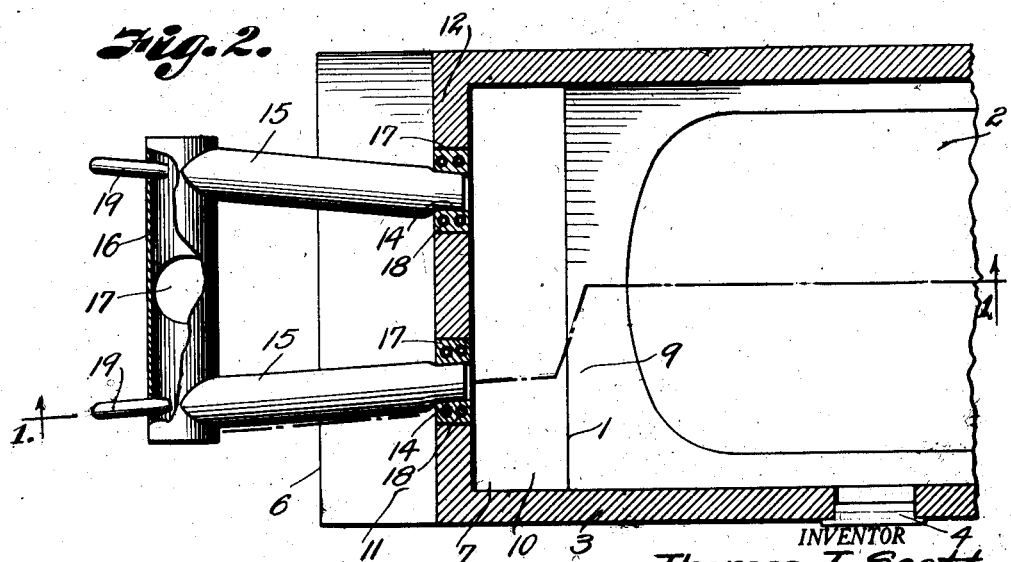
INVENTOR
Thomas T. Scott.
BY
ATTORNEY Patented Feb. 26, 1929.

1,703,460

UNITED STATES PATENT OFFICE.

THOMAS T. SCOTT, OF TORONTO, OHIO, ASSIGNOR, BY MESNE ASSIGNMENTS, TO SCOTT FURNACE COMPANY, OF KANSAS CITY, MISSOURI, A CORPORATION OF MISSOURI.

FURNACE.

Application filed August 21, 1926. Serial No. 130,672.

My invention relates to open hearth furnaces of the regenerator type and constitutes an improvement on the furnace forming the subject matter of Letters Patent No. 1,446,072, issued to me on February 20, 1923, the principal object of the present invention being to provide a more effective mixture of combustion supporting air with the fuel gases and to avoid customary removal of the fuel nozzles to avoid their destruction by the intense heat generated in the hearth chamber when direction of flow of the heating medium is reversed as in ordinary practise.

In accomplishing this object, I have provided improved details of structure, the preferred forms of which are illustrated in the accompanying drawings, wherein:

Fig. 1 is a longitudinal section of a portion of the open hearth furnace embodying my improvements, taken on the line 1—1 of Fig. 2.

Fig. 2 is a horizontal section on the line 2—2 of Fig. 1.

While I have illustrated but one end of the furnace with its burner equipment, it should be understood that the opposite end is of similar construction and provided with a similar burner equipment.

Referring more in detail to the drawings:

1 designates a bridge wall and 2 a hearth constructed in accordance with common practise. 3 designates a side wall provided with feeding doors 4 and a spout outlet (not shown). Spaced from the bridge walls are end walls 6, forming air passage-ways 7 leading to and from the usual checker chambers and ash collectors indicated by the arch 8, the parts up to this point being of any ordinary construction and forming no part of my invention.

The end wall 6 is in accordance with my invention, offset inwardly slightly above the level of the end 9 of the hearth to form a throat 10, the offset being preferably arched and constituting a baffle 11 whereby combustion supporting air is deflected to flow in a substantially horizontal path in the direction of the hearth chamber. Above the offset or baffle 11, the wall 6 is extended, as at 12, and co-operates with the side walls 3 in supporting the furnace roof 13. In the extension 12 are spaced ports 14 and positioned exteriorly of the furnace and at angles converging downwardly and toward the center of the hearth chamber, are fuel nozzles 15. The fuel nozzles illustrated in the accompanying drawings are of a type adapted for the delivery of producer gas to the furnace and communicate at their outer ends with a manifold 16 having a supply conduit 16' which may lead from the manifold to a source of supply of the producer gas. I prefer to provide the ports 14 with bushings 17 comprising conduits 18 for a cooling medium, whereby the ends of the nozzles may be maintained at a non-destructive temperature, and I also prefer to reduce the ends of the nozzles 15 and locate them directly but removably within the bushings. The conduits 18 may be connected in any suitable manner (not shown) with a source of cooling medium supply. I also preferably provide the manifold with jets 19 whereby steam or compressed air may be delivered to the nozzles to adjust the velocity of the fuel gas entering the furnace.

Assuming the furnace to be constructed and assembled as described and that the hearth chamber is being fired from the left hand end illustrated in the drawings, air traveling through the passage 7 meets the baffle and is deflected horizontally into the hearth chamber directly above the bath, so that fuel gas directed downwardly across the line of flow of air, comingles with the air to promote combustion and so that heat from the fuel is directed onto the bath in the usual manner.

The heat produced in the furnace is of such intensity as to destroy the walls of the furnace if not properly directed, but by the arrangement described, this heat has its most intense application out of contact with the walls of the furnace so that the latter are preserved. The products of combustion leave the hearth chamber through the air passage 7 at the end of the furnace opposite the functioning burner and in a downward path below the level of the nozzles at that end. It is a common practise, with ordinary types of furnaces, to remove the nozzles at the outflow end of the furnace before the burner at the other end starts to function but with my arrangement the nozzles at the outflow end may remain permanently in place, as the outflow is directed away from the inactive burner nozzles.

When a cooling medium is circulated through the conduits in the bushings in the nozzle ports, a cooling effect is produced which further tends to safeguard the nozzles and to prevent their destruction from the intense heat of the discharging products of combustion.

With my improvements it is possible therefore to operate a furnace under the reverse heating methods in common use without destruction of the inactive nozzles by the heat at the outgoing end, and without removal of the nozzles to prevent such destruction.

What I claim and desire to secure by Letters Patent is:—

1. A furnace of the character described including side and end walls, bridge walls inset from the end walls to form a hearth chamber and air conduits, arches extending across the outer portions of said conduits at about the level of the bridge walls, leaving vertical passageways adjacent the bridge walls and whereby part of the air delivered through said conduits is deflected laterally across said passageways in the direction of the hearth chamber, and means for discharging a fuel element to the furnace for combination with air delivered through said conduits to provide a combustible mixture.

2. A furnace of the character described including side and end walls, bridge walls inset from the end walls, the end walls being outset at about the level of the bridge walls, forming vertical passages along and continuing above the level of the bridge walls and constituting horizontal arches for directing part of the air delivered upwardly between the end and bridge walls laterally relative to the vertical passages and in direction of the hearth, and means for delivering fuel to the furnace for combination with the air to provide a combustible mixture.

3. A furnace of the character described, including top, side and end walls, bridge walls inset from the end walls to form a hearth chamber and air conduits, arches extending across the outer portions of said conduits at a point between the top wall and a point about the level of the bridge walls, leaving vertical passageways adjacent the bridge walls, and whereby a part of the air delivered through said conduits is deflected laterally across said passageways in the direction of the hearth chamber, and means for discharging a fuel element to the furnace for combination with air delivered through said conduits to provide a combustible mixture.

In testimony whereof I affix my signature.

THOMAS T. SCOTT.